Patented Oct. 21, 1941

2,259,452

UNITED STATES PATENT OFFICE 2,259,452

MINERAL OIL COMPOSITION AND IMPROVING AGENT THEREFOR

Henry G. Berger, William H. James, and Darwin E. Badertscher, Woodbury, N. J., assignors to Socony-Vacuum Oil Company, Incorporated, New York, N. Y., a corporation of New York No Drawing. Application August 2, 1939, Serial No. 287,930

17 Claims. (Cl. 252—53)

This invention has to do in a general way with mineral oil compositions and is more particularly related to mineral oil fractions of the viscous type such as find use as lubricants, dielectrics, etc., which have been improved in their capability of resisting the deleterious effects of oxidation by having incorporated therewith in minor proportion a novel oil-improving agent.

In our copending application now issued as Patent No. 2,177,923, of which this is a continuation in part, we have disclosed viscous mineral oil fractions of the lubricant type which have been improved as to pour point and resistance to oxidation by having incorporated therein a minor proportion of the product obtained by reacting an ortho-phosphito benzoyl chloride or an aromatic ortho-phosphito carboxylic acid chloride with a wax-substituted hydroxyaromatic compound such as wax-phenol.

We have now found that the aromatic orthophosphito carboxylic acid chlorides and derivatives thereof constitute a class of compounds which possess the common property, when added to a viscous mineral oil fraction normally corrosive to alloy bearings under the conditions of use encountered in an internal combustion engine, of substantially retarding or inhibiting such corrosive action. This broad class of compounds, while inclusive of the compounds described and claimed in our copending application above referred to, is distinguished from the disclosure of such application in that the reaction products disclosed in the former application possess the multifunctional property of acting as pour depressants and oxidation inhibitors, whereas many of the compounds contemplated by the present application have no pour depressing action but derive their utility from their power to inhibit oxidation or retard corrosion.

In this latter regard it will be understood that the effect of oxidation upon a mineral oil fraction manifests itself in various ways, depending upon the source of the oil—that is, the crude from which it is derived—the refining treatment which the oil has received, and the particular conditions under which the oil is subjected to oxidation.

Although, as stated above, the broad class of compounds contemplated herein are preferred for use in mineral oil fractions of the lubricant type which are normally corrosive to alloy bearings such as cadmium-silver bearings, certain of the compounds contemplated herein are also effective to retard or inhibit acid formation in highly refined oils of the type used in turbines and transformers; also certain of the compounds or products of reaction are contemplated for use in moderately refined oils of the turbine or transformer oil type.

The broad class of compounds or products contemplated herein as improving agents for mineral oil fractions are obtained as the product of reaction or as derivatives from the product of reaction between an hydroxyaromatic carboxylic acid in which the hydroxyl and the carboxyl groups are attached to adjacent carbon atoms in the nucleus, and phosphorus trichloride. The hydroxyaromatic acids contemplated as initial reactants for the phosphorus trichloride may be either mono- or poly- cyclic and can be represented by the general formulae:

I.

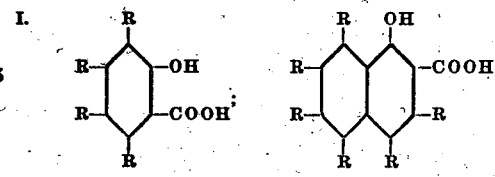

in which R represents hydrogen or a radical selected from the group consisting of hydrogen, alkyl, aryl, alkaryl, and aralkyl groups.

These reaction products are typified by those obtained as the product of reaction or as derivatives from the product of reaction between an ortho-hydroxy benzoic acid and phosphorus trichloride. The product of this reaction, which we may broadly classify as an aromatic orthophosphito carboxylic acid chloride, may be represented by the general formula:

II.

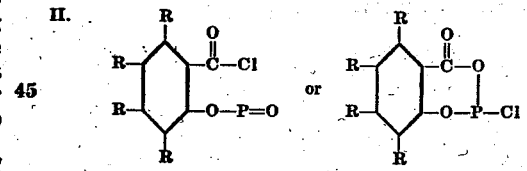

in which R represents hydrogen, alkyl, aryl, alkaryl, or aralkyl groups. Although, as indicated above, there are two possible formulae for the aromatic ortho-phosphito carboxylic acid chlorides contemplated herein, we shall hereinafter use the first of the two formulae to identify these compounds with the understanding that the formula used is intended to cover the reaction product obtained by reacting an ortho-hydroxy benzoic acid with phosphorus trichloride and is not intended as a limitation to the molecular structure which such reaction product might have.

Illustrative of reaction products of phosphorus trichloride and an ortho-hydroxy benzoic acid is the reaction product obtained with salicylic acid. Another example of such reaction product is that obtained with thymotic or thymotinic acid (1-carboxy-2-hydroxy-3-isopropyl-6-methyl benzene). The general reaction involved in the preparation of these ortho-phosphito acid chlorides is, according to Anschütz and Emery (Annalen 239, 301 (1887)), as follows:

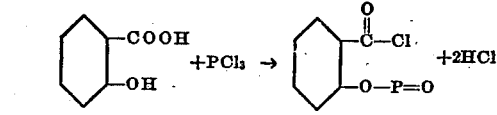

or

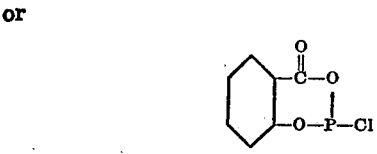

The product obtained according to the foregoing reaction, in which salicylic acid was used as one of the reactants, corresponded to the general formula given above in which R is hydrogen and will be hereinafter referred to as ortho-phosphito benzoyl chloride.

When thymotinic acid is reacted with phosphorus trichloride, the product obtained may be represented by the formula:

II.

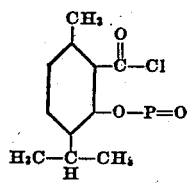

This compound, it will be observed, corresponds to the general formula above in which part of the R's represent alkyl groups and will be hereinafter referred to as ortho-phosphito thymotinyl chloride.

These compounds or reaction products, as pointed out above, may be added directly to the oil in minor proportion as an improving agent, but, as was also indicated above, the present invention contemplates as a broad class of improving agents not only ortho-phosphito acid chlorides of this general type but also the derivatives of such chlorides which may be obtained by the reaction thereof with compounds containing replaceable hydrogen and compounds containing replaceable metal atoms. Representative of the derivatives of aromatic ortho-phosphito carboxylic acid chlorides contemplated herein are those obtained by reacting the chlorides with aliphatic alcohols and aromatic alcohols (phenols or hydroxyaromatic compounds, either substituted or unsubstituted), mercaptans, ammonia and derivatives thereof, including amines and amino compounds, etc. Inclusive of the reactants containing replaceable metal atoms may be mentioned the corresponding metal derivatives of the foregoing compounds, such as alcoholates, phenylates, mercaptides, etc.; also metal salts or derivatives of organic acids such as metal thiocarbonates, metal cyanates, etc.

Although we do not wish to be bound by any theory of the reaction in which these derivative compounds or products are obtained and although we do not wish to be bound by any theory as to the molecular composition of these products, the reaction in which these derivative compounds are formed probably takes place according to the following equation, in which an alcohol (R'OH) is used to illustrate the reactant which is reacted with the aromatic ortho-phosphito carboxylic acid chloride:

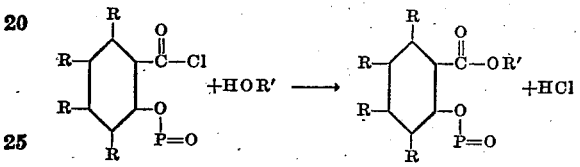

If the product obtained in the foregoing reaction is water-washed, it is possible that two OH groups will hydrate the phosphorus atom, in which event the formula for the product in this case will become:

IV.

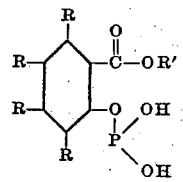

The possible formulae and composition of other reaction products according to the foregoing theory of reaction will vary, of course, with the particular reactant and will be readily apparent to those familiar with the art, but, as indicated above, it is to be understood that a general formula for a series of reactants and reaction products of the type contemplated herein involves a degree of uncertainty, and we therefore do not wish to be bound by any theory as to the molecular composition and exact chemical name of the product or products contemplated herein. However, for purpose of illustration, reaction products of the general type described above may be represented by the following general formula:

V.

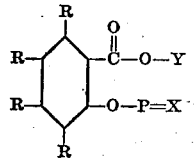

wherein R has the same significance defined above; X represents an oxygen atom or two OH radicals attached to P; and Y represents the residue of a compound containing a replaceable hydrogen atom or a replaceable metal atom which has been removed in the reaction with an aromatic ortho-phosphito carboxylic acid chloride to form a chloride of the said hydrogen or metal atom.

The details in procedures which may be conveniently followed in synthesizing oil-improving agents of the type contemplated herein, together with further details as to the physical properties and behavior of these products in mineral oil will be best appreciated from the following examples:

EXAMPLE I

*Synthesis of aromatic ortho-phosphito carboxylic acid chlorides*

(a) ORTHO-PHOSPHITO BENZOYL CHLORIDE

A mixture of 138 grams of salicylic acid and 137.4 grams of phosphorus trichloride was heated gradually with frequent shaking to a final temperature of 93° C. and held at that temperature until the hydrogen chloride evolution had substantially ceased. The product was a light yellow liquid which fumed in moist air.

(b) ORTHO-PHOSPHITO THYMOTINYL CHLORIDE

In a manner similar to the preceding preparation, 77.6 grams of thymotinic acid (1-carboxy-2-hydroxy-3-isopropyl-6-methyl benzene) and 55 grams of phosphorus trichloride were reacted together to give ortho-phosphito thymotinyl chloride.

EXAMPLE II

*Reaction products of the ortho-phosphito benzoyl chlorides or aromatic ortho-phosphito carboxylic acid chlorides with materials containing replaceable hydrogen and materials containing replaceable metallic atoms*

(a) ORTHO-PHOSPHITO BENZOYL CHLORIDE AND 2-ETHYL HEXANOL

A mixture of 30.4 grams of ortho-phosphito benzoyl chloride and 19.6 grams of 2-ethyl hexanol was heated and stirred in a 100° C. water bath until the HCl evolution had substantially ceased. The reaction mixture was taken up in benzene and filtered. The benzene was then removed by distillation, leaving the product as a residual yellow oil weighing 30 grams. This oil solidified when cold and was removed from a small trace of excess 2-ethyl hexanol by suction filtration.

(b) ORTHO-PHOSPHITO THYMOTINYL CHLORIDE AND DIAMYLAMINE

A solution of 38.7 grams of ortho-phosphito thymotinyl chloride in 40 cc. benzene was added slowly to 47 grams of diamylamine dissolved in 50 cc. of benzene. The reaction was exothermic. The temperature was kept below 65° C. by regulating the rate of addition of the acid chloride. Diamylamine hydrochloride was removed by filtration and the benzene distilled off. The product (distillation residue) was freed from the last traces of hydrochloride by solution in petroleum ether and subsequent filtration. Distillation of the petroleum ether solution yielded the product as a red, viscous residue weighing 51 grams.

(c) ORTHO-PHOSPHITO THYMOTINYL CHLORIDE AND AMYL MERCAPTAN

A mixture of 38.7 grams of ortho-phosphito thymotinyl chloride and 31 grams (excess) of amyl mercaptan was refluxed for about 1½ hours, at the end of which time the hydrogen chloride evolution had substantially ceased. Excess amyl mercaptan was removed by vacuum distillation, leaving the product as a fairly viscous, brown residue weighing 39 grams.

(d) ORTHO-PHOSPHITO THYMOTINYL CHLORIDE AND FUSEL OIL

A mixture of 38.7 grams of ortho-phosphito thymotinyl chloride and 52.8 grams of fusel oil (consisting mainly of amyl alcohols with small proportions of propyl and butyl alcohols) was refluxed and stirred until the hydrogen chloride evolution had substantially ceased. Vacuum distillation of the excess fusel oil yielded the product, a mobile red liquid, as residue.

(e) ORTHO-PHOSPHITO THYMOTINYL CHLORIDE AND DIAMYLPHENOL

A solution of 38.7 grams of ortho-phosphito thymotinyl chloride and 35.1 grams of diamylphenol in 40 cc. benzene was refluxed until the first vigorous evolution of hydrogen chloride gas had ceased. The benzene was then distilled off and the residue heated in a boiling water bath until the hydrogen chloride evolution had substantially ceased. The resulting reaction mixture was then taken up in benzene, filtered and the benzene removed by distillation, leaving the product, a viscous brown oil weighing 60 grams, as a residue.

(f) ORTHO-PHOSPHITO BENZOYL CHLORIDE AND POTASSIUM ETHYL XANTHATE

A solution of 40.4 grams of ortho-phosphito benzoyl chloride in 100 cc. of benzene was added slowly to a suspension of 32 grams of potassium ethyl xanthate in 100 cc. benzol. The mixture was refluxed with stirring for two hours, after which it was cooled and filtered free from potassium chloride and the benzol removed by distillation, leaving the product as a residue of 34 grams of viscous yellow oil.

(g) ORTHO-PHOSPHITO BENZOYL CHLORIDE AND ETHANOLAMINE

A solution of 40.4 grams of ortho-phosphito benzoyl chloride in 100 cc. benzene was added during 13 minutes to a solution of 48.8 grams of monoethanolamine in 100 cc. benzene. The reaction was strongly exothermic and was accompanied by the formation of a hard gummy mass. The solution was decanted from the solid material and the benzene was removed by distillation, leaving as a residue the white sticky product.

(h) ORTHO-PHOSPHITO BENZOYL CHLORIDE AND AMMONIA

A solution of 1.0 gram of ortho-phosphito benzoyl chloride in 100 grams of refined mineral oil was saturated with gaseous ammonia for 20 minutes and then heated slightly and filtered. This oil was diluted with nine parts of the straight mineral oil to yield a blend with a final inhibitor concentration of less than 0.1 per cent.

(i) ORTHO-PHOSPHITO BENZOYL CHLORIDE AND MONO-N-AMYLAMINE

A solution of 40.4 grams of ortho-phosphito benzoyl chloride in 100 cc. benzene was added during 12 minutes to a solution of 34.8 grams of mono-n-amylamine in 100 cc. benzene. The reaction was strongly exothermic. The solution was freed from solid amylamine hydrochloride by filtration. More amine hydrochloride was precipitated by diluting the benzene solution with petroleum ether. After filtration the benzene-petroleum ether was distilled off, leaving the product as a light yellow viscous residue.

(j) ORTHO-PHOSPHITO BENZOYL CHLORIDE AND N-AMYL ANILINE

A solution of 10 grams of ortho-phosphito benzoyl chloride in 25 cc. benzene was added dropwise to a solution of 16.3 grams of N-amyl aniline in 35 cc. benzene. The reaction was exothermic but no separation of solid material took place, even after the reaction mixture had been refluxed for four hours. A solution of 4 grams of pyridine in approximately 10 cc. benzene was added. A brown gummy material precipitated. The benzene solution was decanted from this precipitate and concentrated by distillation to yield a very viscous, green resinous material.

(k) ORTHO-PHOSPHITO BENZOYL CHLORIDE AND POTASSIUM CYANIDE

A mixture of 22.3 grams of ortho-phosphito benzoyl chloride, 6.5 grams of potassium cyanide and 150 cc. dioxane was heated at 90° C. for 1½ hours. An additional 50 cc. dioxane was then added and the mixture refluxed (101° C.) for 30 minutes. The mixture was then filtered and the solvent removed by vacuum distillation, leaving the product as a residue.

(l) ORTHO-PHOSPHITO BENZOYL CHLORIDE AND POTASSIUM THIOCYANATE

A mixture of 20.3 grams of ortho-phosphito benzoyl chloride, 9.7 grams of potassium thiocyanate and 200 cc. of dioxane was refluxed for 2.25 hours. After filtration the dioxane was removed by vacuum distillation to leave the product as a viscous brown residual liquid.

(m) ORTHO-PHOSPHITO BENZOYL CHLORIDE AND P-TERT. AMYL PHENOL DISULFIDE

Five grams of p-tert. amyl phenol disulfide and 5.2 grams of ortho-phosphito benzoyl chloride were dissolved in 15 cc. benzene and refluxed together for 1.5 hours, until the HCl evolution had substantially ceased. The benzene was then removed by vacuum distillation, leaving the material as a hard brown solid.

IMPROVEMENT OF MINERAL OIL FRACTIONS

As was pointed out above, the compounds or reaction products contemplated herein are effective to inhibit the corrosive action of mineral oil fractions normally corrosive to hard metal alloy bearings of the type typified by cadmium-silver bearings. In this regard, our invention contemplates in addition to the mineral oil fractions containing the contemplated compounds or reaction products a method for lubricating alloy bearings which involves the use of a lubricant containing one or more of these compounds or products to provide the lubricant film.

To illustrate the inhibiting action of the improving agents contemplated herein upon mineral oil fractions of the last-mentioned type which are used as motor lubricants, the following test was conducted with a commercial S. A. E. 20 solvent-refined motor oil. A section of a bearing containing cadmium-silver alloy surface and weighing about 6 grams was placed in 30 grams of the oil, which was heated to about 175° C. for 22 hours while a stream of air was bubbled against the surface of the bearing. The weight loss in milligrams of the bearing is interpreted as a measure of the corrosiveness of the oil. In each case, a sample of the oil containing the addition agent was run concurrently with a sample of the blank oil, and each sample contained a section cut from the same bearing. The results obtained with blends of the various reaction products obtained according to the procedures described above are listed in Table I below, and from the results of these tests it will be seen that all of the described compounds are effective to substantially decrease, and in some cases to entirely retard over the period of the test, the corrosive action of the oil toward the test specimen.

TABLE I

| Material added, weight per cent | Corrosion loss, mgms. | |
|---|---|---|
| | Blend | Blank |
| o-Phosphito benzoyl chloride <0.1% | 0 | 48 |
| Reaction product from— | | |
| o-Phosphito benzoyl chloride and 2-ethyl hexanol <0.25% | 7 | 54 |
| o-Phosphito thymotinyl chloride and diamylamine 0.25% | 1 | 35 |
| o-Phosphito thymotinyl chloride and amyl mercaptan 0.25% | 0 | 35 |
| o-Phosphito thymotinyl chloride and fusel oil 0.25% | 4 | 62 |
| o-Phosphito thymotinyl chloride and diamyl phenol 0.25% | 1 | 63 |
| o-Phosphito benzoyl chloride and potassium ethyl xanthate <0.1% | 3 | 40 |
| o-Phosphito benzoyl chloride and ethanolamine <0.1% | 1 | 40 |
| o-Phosphito thymotinyl chloride and ammonia <0.1% | 0 | 48 |
| o-Phosphito benzoyl chloride and mono-n-amyl amine <0.1% | 1 | 48 |
| o-Phosphito benzoyl chloride and N-amyl aniline <0.1% | 0 | 74 |
| o-Phosphito benzoyl chloride and potassium cyanide <0.1% | 3 | 48 |
| o-Phosphito benzoyl chloride and potassium thiocyanate <0.1% | 4 | 48 |
| 0-Phosphito benzoyl chloride and p-tert. amyl phenol disulfide <0.1% | 1 | 91 |

As was also indicated above, certain of the compounds or reaction products contemplated herein are effective to inhibit the deleterious effects of oxidation upon highly refined oils. To demonstrate effectiveness in this regard a very highly acid-refined oil of the type suitable for use in transformers was used. This oil had a specific gravity of 0.871, a flash point of 310° F., and Saybolt Universal viscosity of 69 seconds at 100° F. The test was conducted by bubbling oxygen gas through an oil sample at a temperature of 120° C. for 70 hours, and the neutralization number of the oil after this period was obtained as an indication of the amount of acidic oxidation products formed. Although, as pointed out above, all of the products tested were effective to inhibit corrosion in a solvent-refined oil, some of the same products failed to show particular promise as inhibitors of acid formation in highly refined oils. Certain of the products, however, were highly effective in this regard, and the results obtained with these compounds are listed below in Table II, where the column headed "Weight Per cent" indicates the amount of the named improving agent added, and the column headed "N. N." indicates the neutralization number of the tested example.

TABLE II

| Test sample | Weight | N. N. |
|---|---|---|
| | Per cent | |
| Blank oil | | 20-25 |
| Reaction product from— | | |
| o-Phosphito thymotinyl chloride and n-amyl mercaptan | 0.1 | 10.0 |
| o-Phosphito thymotinyl chloride and fusel oil | 0.1 | 0.12 |
| o-Phosphito thymotinyl chloride and diamylphenol | 0.1 | 0.06 |

We have also tested certain of the reaction products contemplated herein as additive agents for moderately refined oils of the turbine oil type. The particular oil used in this test had a Saybolt viscosity of 152 seconds at 100° F. and a flash point of 385° F. and was of the so-called moderately refined type which had been lightly refined with sulfuric acid. The test involved heating the oil for 3 days at a temperature of 110° C. in the presence of a piece of copper foil and then determining the Lovibond color and neutralization number of the oil. Here again it was found that not all of the reaction products contemplated herein were effective as inhibitors of oxidation in an oil of this type, but an oil blend containing less than 0.1 per cent of the reaction products of o-phosphito benzoyl chloride and mono-n-amyl amine had at the end of the test a neutralization number of 0.01 and a Lovibond color of 2.4, as compared with the oil blank, in which the neutralization number was 0.06 and the Lovibond color was 15 at the end of the test.

It is to be understood that while we have herein described certain preferred procedures for synthesizing the improving agents contemplated herein and have designated certain illustrative reactants which may be employed, the invention is not confined to the specific procedure or reactants described above but includes within its scope whatever changes or modifications fairly come within the spirit of the appended claims.

We claim:

1. An improved mineral oil composition comprising a mineral oil fraction and in admixture therewith a minor proportion of a compound selected from the group consisting of an aromatic ortho-phosphito carboxylic acid chloride and derivatives thereof obtained by reacting an aromatic ortho-phosphito carboxylic acid chloride with a compound selected from the group consisting of ammonia, organic compounds containing replaceable hydrogen and organic compounds containing replaceable metal atoms.

2. An improved mineral oil composition comprising a mineral oil fraction and in admixture therewith a minor proportion of the product obtained by reacting ortho-phosphito benzoyl chloride with a compound selected from the group consisting of ammonia, organic compounds containing replaceable hydrogen and organic compounds containing replaceable metal atoms.

3. An improved mineral oil composition comprising a mineral oil fraction and in admixture therewith a minor proportion of the product obtained by reacting ortho-phosphito thymotinyl chloride with a compound selected from the group consisting of ammonia organic compounds containing replaceable hydrogen and organic compounds containing replaceable metal atoms.

4. A non-corrosive lubricant comprising a viscous mineral oil fraction normally corrosive to alloy bearings under conditions encountered in internal combustion engines and in admixture therewith a minor proportion, sufficient to substantially inhibit said corrosive action, of the product obtained by reacting an aromatic ortho-phosphito carboxylic acid chloride with a compound selected from the group consisting of ammonia, organic compounds containing replaceable hydrogen and organic compounds containing replaceable metal atoms.

5. A non-corrosive lubricant comprising a viscous mineral oil fraction normally corrosive to alloy bearings under conditions encountered in internal combustion engines and in admixture therewith a minor proportion, sufficient to substantially inhibit said corrosive action, of the product obtained by reacting ortho-phosphito benzoyl chloride with a compound selected from the group consisting of ammonia, organic compounds containing replaceable hydrogen and organic compounds containing replaceable metal atoms.

6. A non-corrosive lubricant comprising a viscous mineral oil fraction normally corrosive to alloy bearings under conditions encountered in internal combustion engines and in admixture therewith a minor proportion, sufficient to substantially inhibit said corrosive action, of the product obtained by reacting ortho-phosphito thymotinyl chloride with a compound selected from the group consisting of ammonia organic compounds containing replaceable hydrogen and organic compounds containing replaceable metal atoms.

7. An improved mineral oil composition comprising a mineral oil fraction and in admixture therewith a minor proportion of a reaction product of an ortho-hydroxy benzoic acid and phosphorus trichloride, said product being characterized by the presence of the group

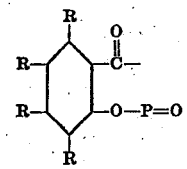

in which the R's represent radicals selected from the group consisting of hydrogen, alkyl, aryl, aralkyl and alkaryl radicals.

8. An improved mineral oil composition comprising a mineral oil fraction and in admixture therewith a minor proportion of a compound selected from the group consisting of an aromatic ortho-phosphito carboxylic acid chloride having the general formula

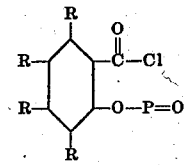

in which the R's represent radicals selected from the group consisting of hydrogen, alkyl, aryl, aralkyl and alkaryl groups and derivatives thereof obtained by reacting the said ortho-phosphito carboxylic acid chloride with a compound selected from the group consisting of ammonia, organic compounds containing replaceable hydrogen and organic compounds containing replaceable metallic atoms.

9. An improved mineral oil composition comprising a mineral oil fraction and in admixture therewith a minor proportion of a compound selected from the group consisting of an aromatic ortho-phosphito carboxylic acid chloride having the general formula

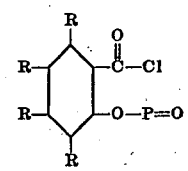

in which the R's represent radicals selected from the group consisting of hydrogen, alkyl, aryl, aralkyl and alkaryl groups and derivatives thereof obtained by reacting the said ortho-phosphito carboxylic acid chloride with an alcohol.

10. An improved mineral oil composition comprising a mineral oil fraction and in admixture therewith a minor proportion of a compound selected from the group consisting of an aromatic ortho-phosphito carboxylic acid chloride having the general formula

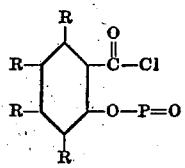

in which the R's represent radicals selected from the group consisting of hydrogen, alkyl, aryl, aralkyl and alkaryl groups and derivatives thereof obtained by reacting the said ortho-phosphito carboxylic acid chloride with a mercaptan.

11. An improved mineral oil composition comprising a mineral oil fraction and in admixture therewith a minor proportion of a compound selected from the group consisting of an aromatic ortho-phosphito carboxylic acid chloride having the general formula

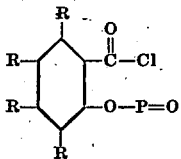

in which the R's represent radicals selected from the group consisting of hydrogen, alkyl, aryl, aralkyl and alkaryl groups and derivatives thereof obtained by reacting the said ortho-phosphito carboxylic acid chloride with an amine.

12. An improved mineral oil composition comprising a mineral oil fraction and in admixture therewith a minor proportion of a reaction product obtained by first reacting phosphorus trichlorine with an hydroxyaromatic carboxylic acid and then reacting the product thus obtained with a compound selected from the group consisting of ammonia, organic compounds containing reactive hydrogen and organic compounds containing reactive metal atoms.

13. The method of lubricating relatively moving metallic surfaces having the corrosive susceptibility of hard metal alloys of the cadmium-silver type which comprises maintaining between the bearing surfaces a lubricant film having as a primary lubricating constituent the combination of a major portion of a mineral oil normally corrosive to alloys of the cadmium-silver type and a minor proportion of a compound selected from the group consisting of an aromatic ortho-phosphito carboxylic acid chloride and derivatives thereof obtained by reacting an aromatic ortho-phosphito carboxylic acid chloride with a compound selected from the group consisting of ammonia, organic compounds containing replaceable hydrogen and organic compounds containing replaceable metal atoms.

14. The method of lubricating relatively moving metallic surfaces having the corrosive susceptibility of hard metal alloys of the cadmium-silver type which comprises maintaining between the bearing surfaces a lubricant film having as a primary lubricating constituent the combination of a major portion of a mineral oil normally corrosive to alloys of the cadmium-silver type and a minor proportion of a reaction product obtained by first reacting an aromatic orthohydroxy carboxylic acid with phosphorus trichloride and then reacting the product thus obtained with a compound selected from the group consisting of ammonia, organic compounds containing replaceable hydrogen and organic compounds containing replaceable metal atoms.

15. The method of lubricating relatively moving metallic surfaces having the corrosive susceptibility of hard metal alloys of the cadmium-silver type which comprises maintaining between the bearing surfaces a lubricant film having as a primary lubricating constituent the combination of a major portion of a mineral oil normally corrosive to alloys of the cadmium-silver type and a minor proportion of a compound selected from the group consisting of an aromatic ortho-phosphito benzoyl chloride and derivatives thereof obtained by reacting an aromatic ortho-phosphito carboxylic acid chloride with a compound selected from the group consisting of ammonia, organic compounds containing replaceable hydrogen and organic compounds containing replaceable metal atoms.

16. As a new composition of matter for use as a mineral oil-improving agent or the like, the product obtained by first reacting an o-hydroxybenzoic acid with phosphorus trichoride and then reacting the product thus obtained with a compound selected from the group consisting of ammonia, organic compounds containing replaceable hydrogen and organic compounds containing replaceable metallic atoms to form an inorganic chloride and the said mineral oil-improving agent; and separating the inorganic chloride from the said mineral oil-improving agent.

17. As a new composition of matter for use as a mineral oil improving agent, the product obtained by first reacting phosphorus trichloride with an hydroxyaromatic carboxylic acid and then reacting the product thus obtained with a compound selected from the group consisting of ammonia, organic compounds containing reactive hydrogen and organic compounds containing reactive metal atoms.

HENRY G. BERGER.
WILLIAM H. JAMES.
DARWIN E. BADERTSCHER.